United States Patent [19]
Adams

[11] 3,843,087
[45] Oct. 22, 1974

[54] SEAT SLIDE CATCH MECHANISM

[75] Inventor: Albert John Adams, Fetcham, England

[73] Assignee: A. W. Chapman Limited, London, England

[22] Filed: May 14, 1973

[21] Appl. No.: 359,783

[30] Foreign Application Priority Data
June 6, 1972 Great Britain.................. 26245/72

[52] U.S. Cl. .............................................. 248/430
[51] Int. Cl............................................ B60m 1/08
[58] Field of Search .......... 248/430, 429, 424, 416, 248/393; 74/533; 297/344; 108/143; 296/65 R

[56] References Cited
UNITED STATES PATENTS

| | | | |
|---|---|---|---|
| 1,701,044 | 2/1929 | Knaur et al. ...................... | 297/344 |
| 2,064,592 | 12/1936 | DeCary............................. | 297/344 |
| 2,096,437 | 10/1937 | Potter.............................. | 248/430 |
| 2,636,545 | 4/1953 | Johnson............................ | 248/430 |
| 3,039,820 | 6/1962 | Dafoe............................... | 297/344 |
| 3,350,046 | 10/1967 | Kirk................................. | 248/430 |
| 3,393,019 | 7/1968 | Fraser et al. ...................... | 308/6 R |

FOREIGN PATENTS OR APPLICATIONS
685,372  4/1964  Canada.............................. 248/430

Primary Examiner—Marion Parsons, Jr.
Attorney, Agent, or Firm—Weiner, Basile and Weintraub

[57] ABSTRACT

A seat slide mechanism whose rail (fixed to the floor of a vehicle for example) and slide (fixed to the underside of a seat) are movable relative to one another in order to adjust the position of said seat, the position of said seat thereafter being maintained by a catch lever which has a number of prongs which extend through a like number of holes in the rail, said catch lever being carried by the slide. One end of the catch lever is pivotally connected to the slide and the other end of the catch lever is pivotally connected to an operating handle, the plane which contains the said two pivot axes being as nearly in alignment with the holes in said rail as the construction of the seat slide mechanism permits.

4 Claims, 9 Drawing Figures

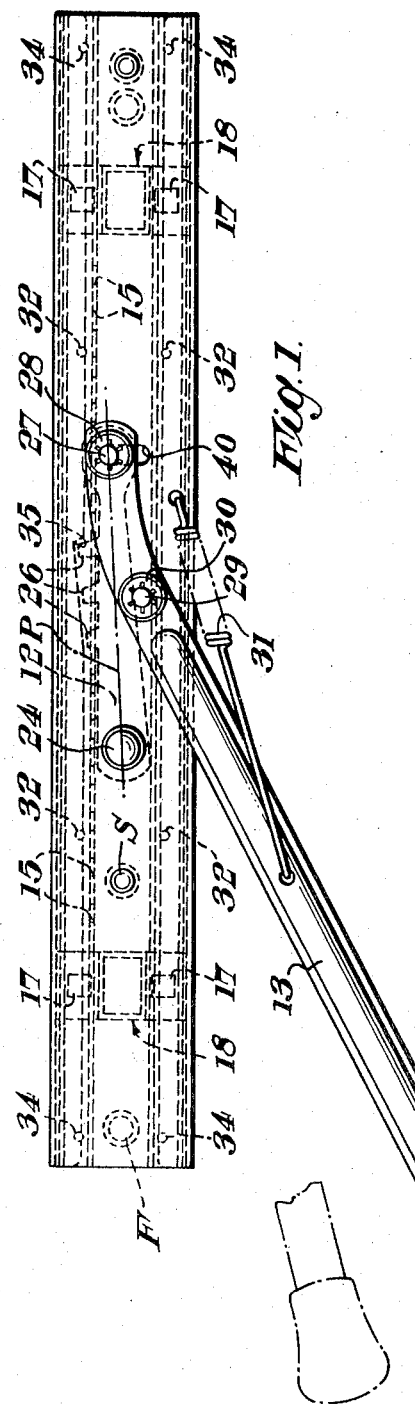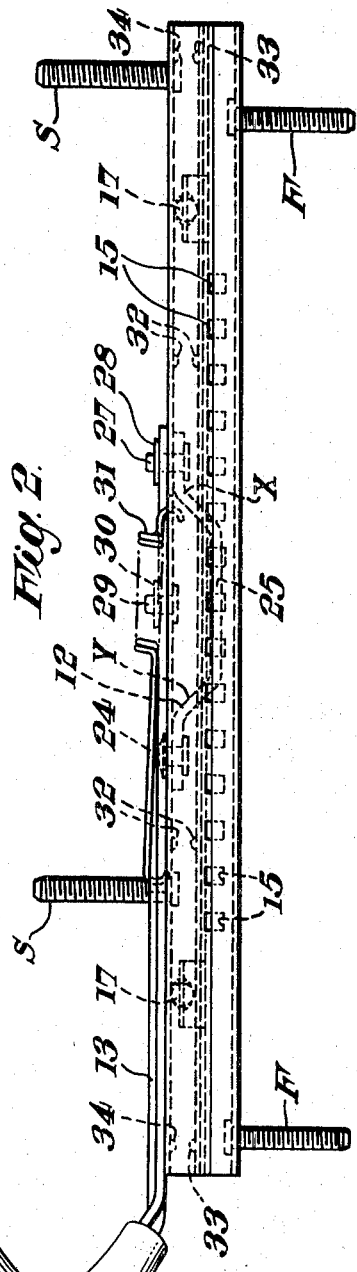

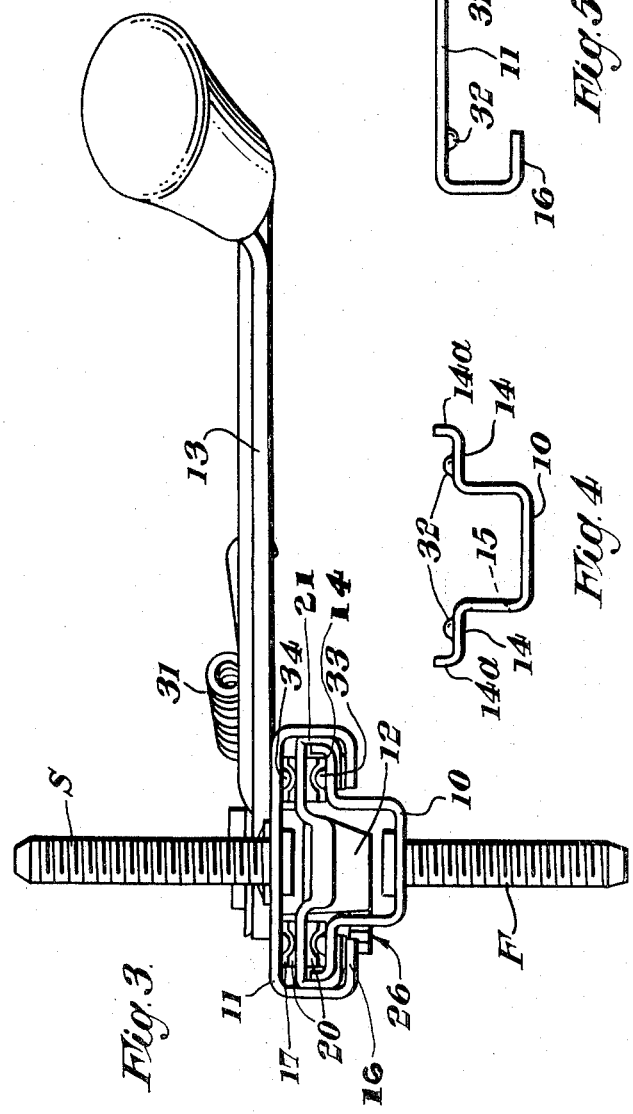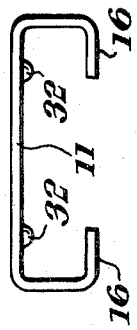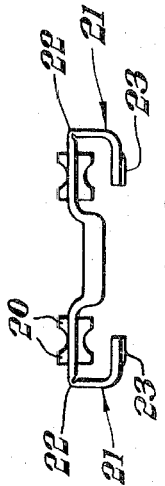

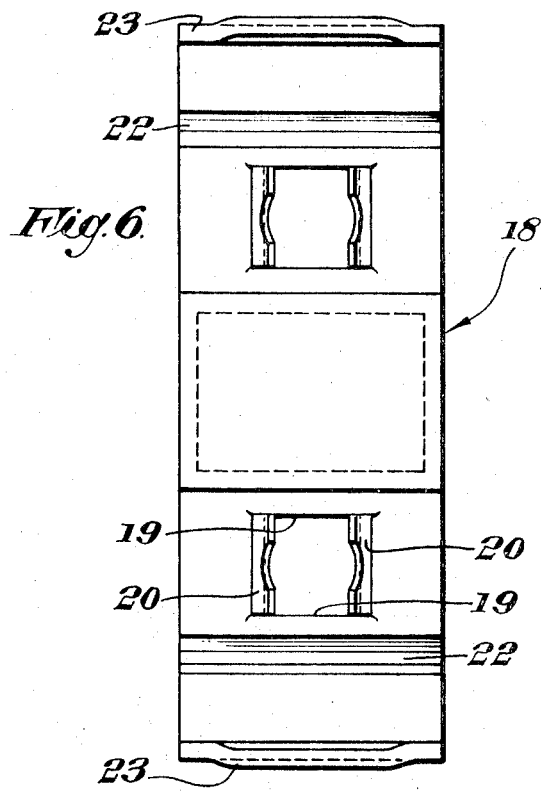
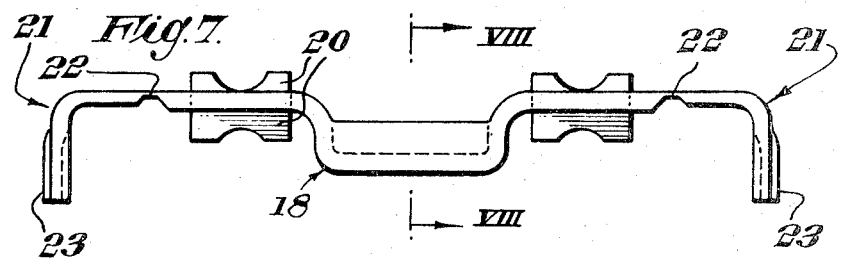
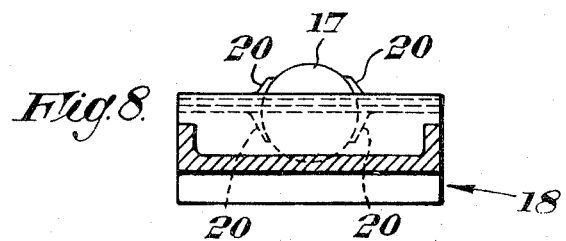

SEAT SLIDE CATCH MECHANISM

This invention relates to a seat slide catch mechanism.

The present invention consists in a seat slide mechanism which includes a slide and a rail slideable one with respect to the other, a catch lever pivotally secured at one end thereof to the slide and at the other end thereof to one end of a catch lever operating handle which is pivotally mounted on the slide, the connection between the pivotally interconnected ends of the catch lever and the catch lever operating handle being movable in an arc along a slot formed therefor in the slide when said operating handle is moved angularly about its pivotal axis, at least two prongs on said catch lever, a rack on said rail engageable by said prongs to effect a releasable connection of the slide to the rail and spring means urging said prongs into engagement with said rack, whereby the relative positions of the slide and the rail are adjustable.

In a preferred embodiment of said mechanism, a. said one end of the catch lever is pivotally connected to the slide by a spun rivet;

b. the catch lever operating handle is pivotally connected to the slide by a rivet and locking washer; and c. the other end of the catch lever is connected to said one end of the catch lever operating handle by a rivet and locking washer.

The present invention will now be more particularly described with reference to the accompanying drawings, in which:

FIG. 1 illustrates a top plan view of a complete catch slide and rail assembly according to the present invention;

FIG. 2 illustrates a side elevation of the assembly shown in FIG. 1;

FIG. 3 illustrates an end elevation of said assembly and is drawn to a larger scale than FIGS. 1 and 2;

FIGS. 4 and 5 are end elevations of the rail and the slide respectively;

FIGS. 6 and 7 illustrate a roller retainer in plan and in elevation, respectively without the rollers in position therein;

FIG. 8 illustrates a section on the line VIII—VIII of FIG. 7 but with a roller shown in position therein; and FIG. 9 illustrates an elevation, similar to that of FIG. 7, of the roller retainer, showing the manner in which two parts thereof hinge downwardly for the purpose described below.

Referring to the drawings, there is illustrated therein a seat slide mechanism which comprises a rail 10 intended to be fixed by bolts F to the floor of for example a motor vehicle, a slide 11 intended to be fixed by bolts S to the underside of a vehicle seat, a catch lever 12 pivotally connected at one end thereof to the slide 11 and at the other end thereof to one end of a catch lever operating handle 13, which is also pivotally connected to the slide 11.

The rail 10 has outwardly directed flanges 14 whose free edges 14a are turned upwardly for a purpose hereinafter referred to. The rail is of substantially U-section and the flanges 14 are integral with the upright limbs of the U and are at the free ends of said limbs. In one of said limbs, holes 15 are provided.

The slide 11 is a channel section and is formed from a U-section member the free ends of whose limbs are bent inwardly to form inwardly directed flanges 16.

The rail 10 and the slide 11 are intended to be inserted into one another so that the outwardly directed flanges of the rail are positioned within the channel section slide. The slide 11 is supported on the rail 10 by spaced pairs of case-hardened steel rollers 17 which are accommodated in two spaced roller retainers 18.

Each retainer 18 is made of a synthetic resin material having a low coefficient of friction (for example polypropylene copolymer) and provides accommodation for two rollers 17 as can be seen from FIGS. 6, 7 and 8. Each of said rollers is made of case-hardened steel and is pushed, with a snap fit, into a space which is defined by the edges 19 and by oppositely concave-curved elements 20 whose free ends at least are flexible, the roller once located in said space being firmly retained therein with complete freedom for rotation therein.

Parts 21 of each roller retainer are so made as to hinge at reduced-thickness portions 22 into the positions thereof shown in FIG. 9.

Said retainer 18 is shown in FIG. 3 in the condition described in the preceding paragraph, the result being that the outwardly directed flanges 14 of the rail 10 and the inwardly directed flanges 16 of the slide 11 are separated by said parts 21 of the retainer, thereby eliminating all metal-to-metal contact between the rail and the slide and consequently eliminating rattle. The elimination of rattle is facilitated by the bowed portions 23 of the parts 21, said portions 23 providing some degree of resilience between the flanges 14 and 16.

It will be appreciated that the rollers 17 will, in use, be in contact with the upper surfaces (as seen in FIG. 3) of the flanges 14 and with the corresponding surface portions of the slide 11, the upturned edges 14a of the flanges 14 serving as guides for the vertical wall of the retainer.

The catch lever 12 is pivotally connected to the slide 11 by a spun rivet 24 and is then suitably cranked at X and Y (see FIG. 2) to bring a portion 25 thereof into register with the holes 15 in the rail 10, said portion 25 being provided with three spaced prongs 26 which are intended to extend into three adjacent holes 15. The end of the lever 12 remote from the rivet 24 is pivotally connected to one end of the handle 13 by a rivet 27 and a locking washer 28. The handle is pivotally connected to the slide 11 by a rivet 29 and a locking washer 30.

A tension spring 31 is anchored at its opposite ends to the slide 11 and to the handle 13 in order to urge the handle to keep the prongs 26 of the catch lever 12 in engagement with the respective holes 15 in the rail 10.

Stops 32 are provided in corresponding positions in both the rail 10 and the slide 11 when said rail and said slide are manufactured. Stops 33 are formed in the rail 10 when manufactured but corresponding stops 34 are not formed in the slide 11 until after assembly of the slide, the rail and the roller retainers 18 and their captive rollers 17. The various stops 32, 33, 34 limit the extent of movement of the retainers 18 and prevent their becoming detached from the assembly.

It will be noted that one flange 16 of the slide 11 is cut-away at 35 for the accommodation of the prongs 26 which would, in the absence of said cut-away, foul the flange and be prevented from correct positive engagement of the holes 15.

The shank of the rivet 27 extends through an arcuate slot 40 formed in the slide 11. This slot permits the angular movements of the interconnected ends of the lever 12 and the handle 13 which are necessary which it is desired to move the slide 11 relative to the rail 10 to a new setting.

Some of the advantages obtained by the use of the seat slide mechanism described above are as follows:

Compared with the seat slide construction in which the operating handle is pivotally mounted on a plate which is welded to the slide, which construction is costly by virtue of the plate and the necessity for a welding operation and which construction has with weight increased by said plate, the manufacture of the seat slide construction described in this Application is simplified by the omission of a step (welding a plate to the slide) and the cost saving can be devoted to providing greater strength.

Furthermore, the pivotal connection of one end of the catch lever 12 directly to the slide 11 enables the pivotal axis to be brought very near to the plane which contains the surface of the limb of the U-shaped rail 10 in which the holes 15 are provided (see FIG. 1). It follows from this that it is also made possible to bring the pivotal connection of the other end of said lever 12 to the operating handle 13 very near to said plane, this being achieved by the formation of the slot 40 through which the shank of the rivet 27 extends. The plane P (FIG. 1) containing the above-mentioned pivotal axes is as near to or is as nearly in alignment with the first-mentioned plane as is feasible in the seat slide construction, and this imparts great strength to the construction.

Moreover, the three prongs 26 and the configuration thereof as seen in FIG. 1 (namely, with sightly curved leading edges which create a true hooking action between the lever 12 and the racking provided by the holes 15) also contribute to the greatly increased strength of the seat slide construction described in this Application as compared with known seat slide constructions.

Again, the position of the pivotal axis about which the handle 13 moves (namely, the axis of the rivet 29) contributes to the strength of the construction. Said position is only slightly offset from said plane P.

The sum of all these features, and the provision of the spring 31 which at all times urges the prongs 26 into engagement wite the respective holes 15, has the effect under the conditions of a vehicle collision of the forces developed in such collision being absorbed by the catch lever 12 without disengagement of the prongs from the racking. In fact, when tested on a rig with an applied horizontal load of 2,800 lbs, the seat slide construction described in this Application was found to show minimal distortion of the web of the slide around the rivet 24, the catch lever having suffered distortion in its cranked portions. Specifically, the rivet 27 and the slide had moved from right to left as seen in FIG. 2 and had buckled the portion X of the lever 12, and corresponding movement of the rivet had stretched or slightly flattened out the cranking of the portion Y of the lever 12, these distortions of the lever 12 not having led to disengagement of the prongs 26 from the racking. Such undesirable disengagement is prevented not only by the configuration of the prongs described above but also by the spring 31 acting on the handle 13 to resist any tendency of the lever 12 to move angularly (in a clockwise direction as seen in FIG. 1).

What I claim as my invention and desire to secure by letters patent of the United States is:

1. A seat slide mechanism comprising
   a. a rail securable to a floor so as to be fixed thereto;
   b. a slide securable to a seat so as to be fixed thereto;
   c. means providing parallel track surfaces on said rail and means providing parallel track surfaces on said slide, the rail and the slide being so disposed that one of the track surfaces on said rail is in vertical register with one of the track surfaces on said slide and that the other of the track surfaces on said rail is in vertical register with the other of the track surfaces on said slide;
   d. two rollers in contact with said one track surfaces and spaced from one another longitudinally of said rail and said slide, and two additional rollers in contact with said other track surfaces and spaced from one another longitudinally of said rail and said slide;
   e. a catch lever having two ends and an intermediate portion;
   f. a catch lever operating handle having two ends;
   g. first means establishing a pivotal connection between said operating handle and said slide;
   h. a slot in said slide and second means extending through said slot and establishing a pivotal connection between corresponding one ends of said catch lever and said operating handle;
   i. third means establishing a pivotal connection between the other end of said catch lever and said slide;
   j. at least two prongs formed in said intermediate portion of said catch lever;
   k. a rack on said rail, said rack being engageable by said prongs to effect a releasable connection of the slide to the rail;
   l. spring means connected between said slide and said operating handle and tending at all times to urge said prongs into engagement with said rack.

2. A seat slide mechanism as claimed in claim 1, wherein the plane containing the axis of said second means and the axis of said third means is as near to the plane of said rack as the mechanism permits.

3. A seat slide mechanism as claimed in claim 2, wherein there are three prongs formed in said intermediate portion of said catch lever.

4. A seat slide mechanism as claimed in claim 2, wherein
   1. said first means is constituted by a rivet and a locking washer;
   2. said second means is constituted by a rivet and a locking washer;
   3. said third means is constituted by a spun rivet.

* * * * *